(12) United States Patent
Sakai

(10) Patent No.: US 7,596,453 B2
(45) Date of Patent: Sep. 29, 2009

(54) DIGITAL SCALE

(75) Inventor: Yoshio Sakai, Shiki (JP)

(73) Assignee: Tanita Corporation, Tokyo (JP)

( * ) Notice: Subject to any disclaimer, the term of this patent is extended or adjusted under 35 U.S.C. 154(b) by 0 days.

(21) Appl. No.: 11/878,840

(22) Filed: Jul. 27, 2007

(65) Prior Publication Data

US 2008/0059097 A1 Mar. 6, 2008

(30) Foreign Application Priority Data

Aug. 29, 2006 (JP) .............................. 2006-231727

(51) Int. Cl.
*G06F 19/00* (2006.01)
*G06F 15/00* (2006.01)
(52) U.S. Cl. ........................................ 702/23; 702/173
(58) Field of Classification Search ................... 702/23, 702/173
See application file for complete search history.

(56) References Cited

U.S. PATENT DOCUMENTS

2006/0096789 A1  5/2006  Kenmochi

FOREIGN PATENT DOCUMENTS

JP       2006-162589       *   6/2006

OTHER PUBLICATIONS

Chinese Office Action issued in Chinese Patent Application No. CN 2007101480400 dated Apr. 3, 2009.

* cited by examiner

*Primary Examiner*—Tung S Lau
*Assistant Examiner*—Sujoy K Kundu
(74) *Attorney, Agent, or Firm*—McDermott Will & Emery LLP

(57) ABSTRACT

A digital scale is provided that switches a measuring interval according to the amount of variation of sampled data, and computes a weight. Embodiments include a scale with pre-stored scale intervals set at multiple levels, and allowable ranges of fluctuation that correspond to the scale intervals. The scale acquires digital data of a load continuously, and computes a predetermined number, or a fluctuation range in a predetermined time, of the acquired digital data. The scale then determines the degree of variation of the digital data by comparing the computed fluctuation range with the allowable range of fluctuation stored for each scale interval, and switches the scale interval based on the determined degree of variation, thereby allowing the scale to measure and compute the weight of the load even if the fluctuation is large.

4 Claims, 5 Drawing Sheets

LOAD VALUE TIME-SERIES FLUCTUATION GRAPH - IN NORMAL STATE -

LOAD VALUE TIME-SERIES FLUCTUATION GRAPH - IMMEDIATELY AFTER EXERCISE -

DIGITAL SCALE

BACKGROUND OF THE INVENTION (i) Field of the Invention

The present invention relates to a digital scale.

(ii) Description of the Related Art

Conventional scales measure a weight by causing a variation of sampled load data to quickly converge to within a predetermined rage in which a weight value based on a preset scale interval can be displayed. This technique for causing data to converge is not limited to scales and generally exists in various forms. For example, to cancel the influence of vibration which causes load data to fluctuate, an analog filter or digital filter tuned to the frequency of the vibration is available. In particular, in the case of scales, vibrations of relatively long vibration period, e.g. external factors, such as the body motion of a subject standing on a scale and the environment in which the scale is placed cause load data to fluctuate. Thus, the above analog filter or digital filter constitutes a low-pass filter. An example of the analog filter is a secondary low-pass filter using an operational amplifier, and an example of the digital filter is a moving average procedure of sampled data.

Further, there are digital scales which expand the above predetermined range (i.e. allowable range of the variation of sampled load data, thereby considering that the load data has become stable, and display the average of the sampled data falling within this predetermined range in terms of the body weight value based on the above scale interval, when the variation of the sampled load data does not fall within the predetermined range and the weight value cannot be displayed based on the preset scale interval, the predetermined range being determined according to the age and body weight of a subject (for example, refer to Patent Literature 1).

Patent Literature 1

Japanese Patent Laid-Open Publication No. 2006-162589

However, when a commonly used filter is used, the influence of vibrations caused by body motions caused by body sway, breathing, pulsation and the like or external factors often cause a very irregular and complicated variation in sampled load data. Further, as the measurement accuracy of the scale is increased, i.e. the value of the above preset scale interval is decreased, the allowable range of variation of data which makes it possible to display a body weight value based on the preset scale interval becomes narrower. Accordingly, a high-order low-pass filter is required to maintain measurement accuracy and make data stable, so that the whole system including the low-pass filter becomes complicated and expensive. Further, since time until the data becomes stable becomes long, a subject, especially in the case of scales, must keep standing straight and stiff with body motions suppressed as much as possible. Forcing control of posture over a long period of time adversely causes larger body motions, so that the variation of sampled data becomes large, the sampled data does not fit within the allowable range which displays a body weight value based on the preset scale interval and a measurement error may result.

Further, when the data is considered to have become stable by expanding the above predetermined range (allowable range of variation), measurement time becomes short. However, when the preset scale interval is 100 g, for example, the predetermined range must be at least less than 50 g, and since a load value based on the forcibly set scale interval is calculated by use of the average of data conversed to within the above predetermined range of 100 g, the reliability of measurement value itself may deteriorate.

Therefore, the present invention solves the above problems and provides a scale which switches a scale interval according to the degree of variation of sampled data and acquires a highly reliable weight value based on the switched scale interval.

SUMMARY OF THE INVENTION

To solve the above problems, the present invention provides a digital scale which computes a weight value based on a predetermined scale interval, the scale comprising data acquiring means, computation means, storage means, judging means, and scale interval switching means, wherein the data acquiring means acquires digital data of a load continuously, the computation means computes a predetermined number or a fluctuation range in a predetermined time of the acquired digital data, the storage means stores scale intervals set at multiple levels and allowable ranges of the fluctuation range that correspond to the scale intervals, the judging means determines the degree of variation of the digital data by comparing the computed fluctuation range with the allowable range of the fluctuation range which is stored for each scale interval, and the scale interval switching means switches the scale interval based on the determined degree of variation.

Further, the judging means compares the computed fluctuation range with the allowable range of the fluctuation range which is stored for each scale interval, starting from the allowable range of the fluctuation range corresponding to the smallest scale interval to the allowable range of the fluctuation range corresponding to a larger scale interval in turn.

In addition, the display means displays a weight value computed based on the smallest scale interval out of switched scale intervals.

A digital scale of the present invention is a digital scale which computes a weight value based on a predetermined scale interval, the scale comprising data acquiring means, computation means, storage means, judging means, and scale interval switching means, wherein the data acquiring means acquires digital data of a load continuously, the computation means computes a predetermined number or a fluctuation range in a predetermined time of the acquired digital data, the storage means stores scale intervals set at multiple levels and allowable ranges of the fluctuation range that correspond to the scale intervals, the judging means determines the degree of variation of the digital data by comparing the computed fluctuation range with the allowable range of the fluctuation range which is stored for each scale interval, and the scale interval switching means switches the scale interval based on the determined degree of variation. Thus, the digital scale obviates need for a complicated and expensive filter associated with data processing and makes it possible to acquire a highly reliable weight value in a short measurement time. In particular, since the scale computes a body weight value based on a scale interval corresponding to the body motion of a subject in measurement of body weight, it requires no control of posture over a long period of time, can avoid a measurement error that the body weight value cannot be computed and is easy to use.

Further, the judging means compares the computed fluctuation range with the allowable range of the fluctuation range which is stored for each scale interval, starting from the allowable range of the fluctuation range corresponding to the smallest scale interval to the allowable range of the fluctuation range corresponding to a larger scale interval in turn. In addition, the display means displays a weight value computed based on the smallest scale interval out of switched scale intervals. Consequently, the digital scale of the present invention can display a weight value of as high measurement accuracy as possible, even when the variation of the data is not stable.

DETAILED DESCRIPTION OF THE PREFERRED EMBODIMENTS

A digital scale of the present invention is a digital scale which computes a weight value based on a predetermined scale interval, the scale comprising data acquiring means, computation means, storage means, judging means, and scale interval switching means, wherein the data acquiring means acquires digital data of a load continuously, the computation means computes a predetermined number or a fluctuation range in a predetermined time of the acquired digital data, the storage means stores scale intervals set at multiple levels and allowable ranges of the fluctuation range that correspond to the scale intervals, the judging means determines the degree of variation of the digital data by comparing the computed fluctuation range with the allowable range of the fluctuation range which is stored for each scale interval, and the scale interval switching means switches the scale interval based on the determined degree of variation.

The term "predetermined number" here generally represents the number of sampling data necessary for computing the variation of the data. The term "predetermined time" here generally represents the time necessary for computing the variation of the data.

Further, the judging means compares the computed fluctuation range with the allowable range of the fluctuation range which is stored for each scale interval, starting from the allowable range of the fluctuation range corresponding to the smallest scale interval to the allowable range of the fluctuation range corresponding to a larger scale interval in turn.

In addition, the display means displays a weight value computed based on the smallest scale interval out of switched scale intervals.

EXAMPLE 1

Example 1 of the present invention exemplifies a digital scale (hereinafter simply referred to as "scale") which acquires a highly reliable body weight value in a short measurement time by switching scale intervals which are minimum indicated values representing weight measurement accuracy which have been set at multiple levels in advance according to the degree of variation of sampled body weight digital data (hereinafter simply referred to as "data").

Figure 1:
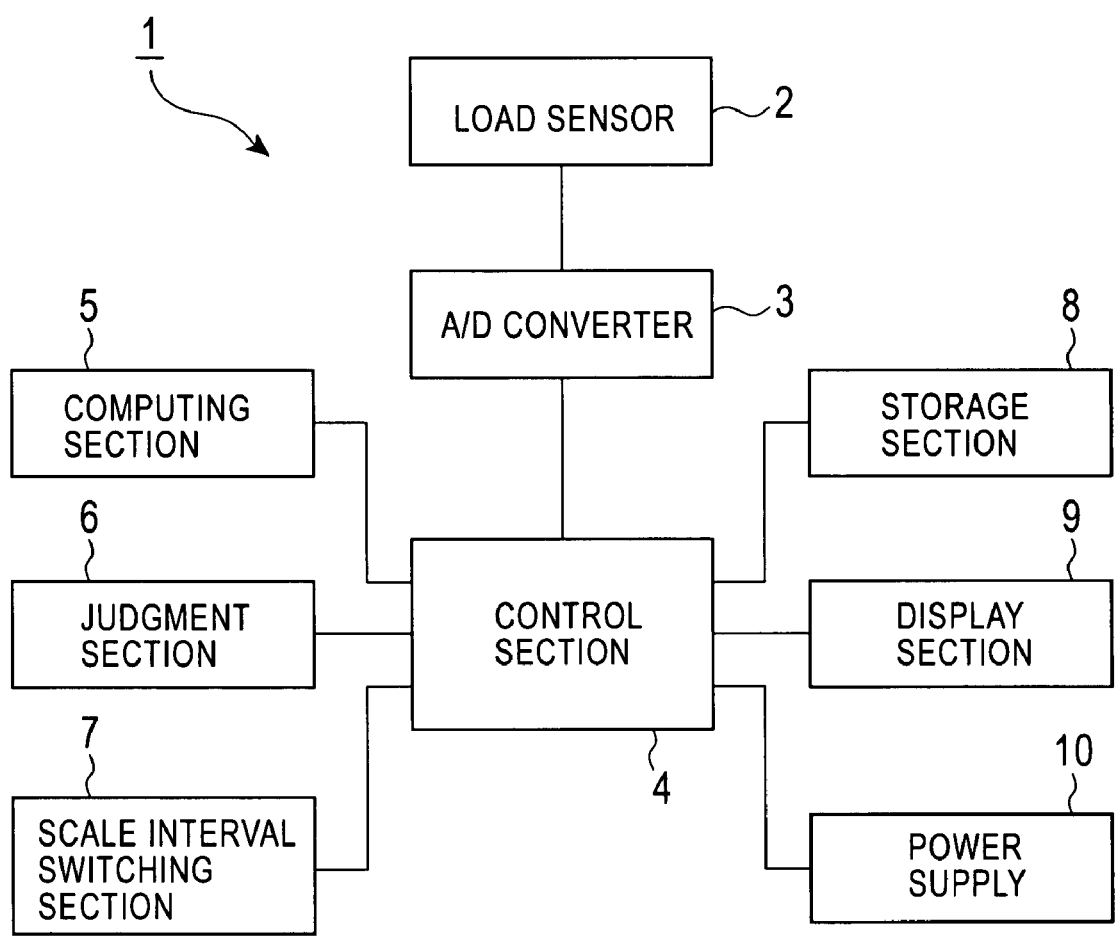
FIG. 1 is a block diagram illustrating an overview of the configuration of electrical circuit incorporated in a scale 1.
Figure 2:
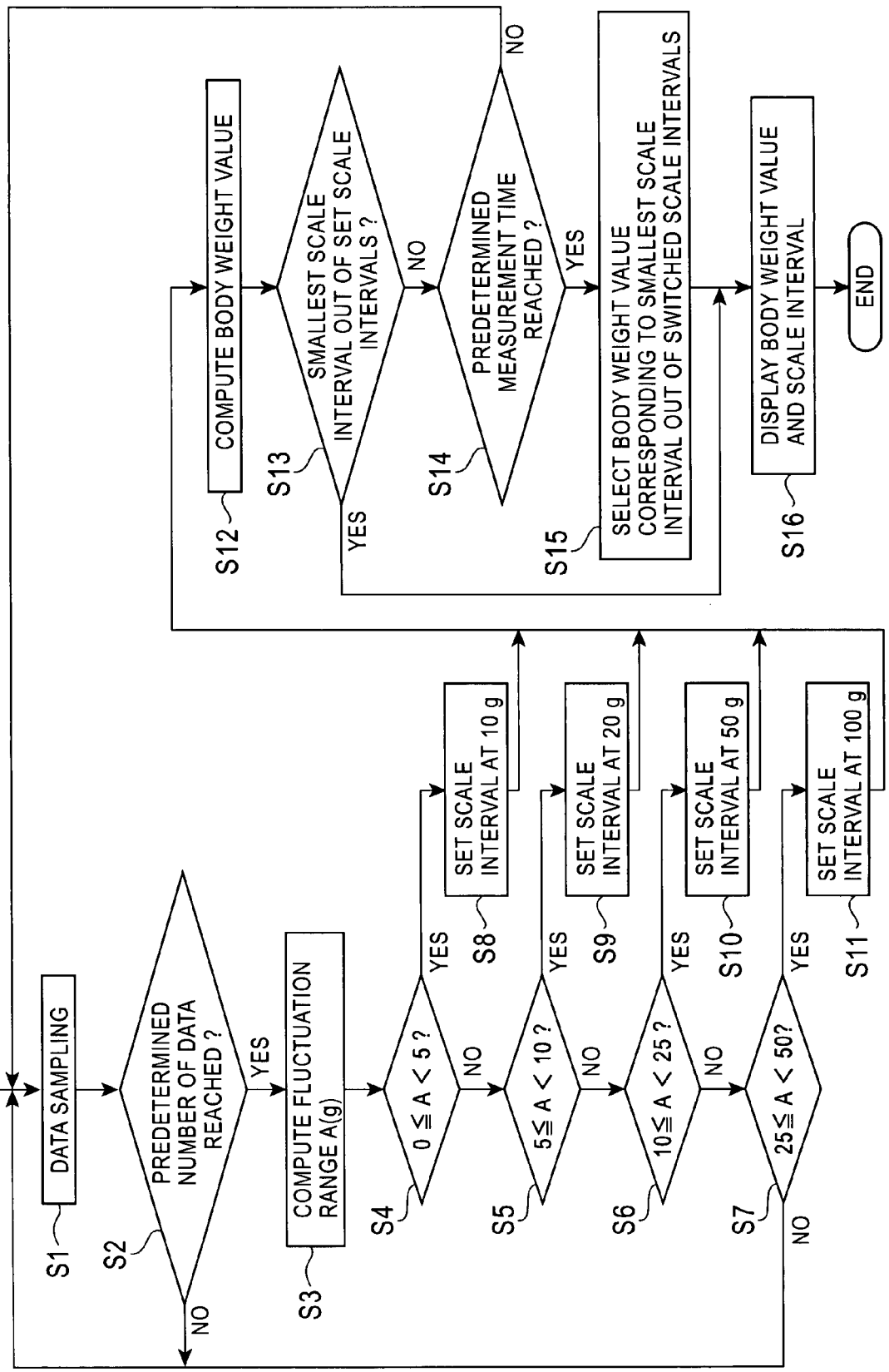
FIG. 2 is a flowchart illustrating the operation of the scale 1.
Figure 3A:
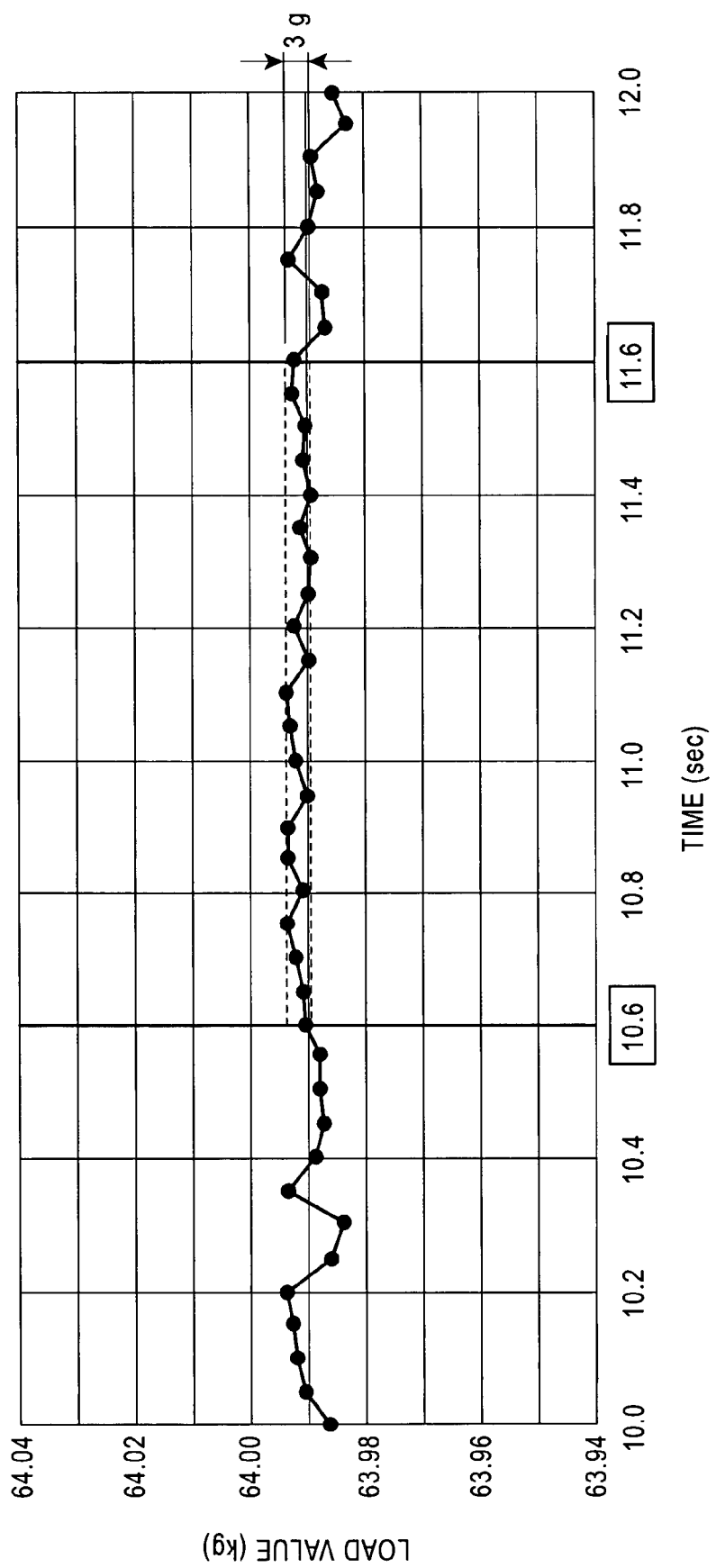
FIG. 3 shows graphs illustrating time-series fluctuation of load value, wherein (A) is a graph illustrating time-series fluctuation of load value measured when a subject is in a normal state and (B) is a graph illustrating time-series fluctuation of load value measured immediately after the subject has finished exercising.
Figure 3B:
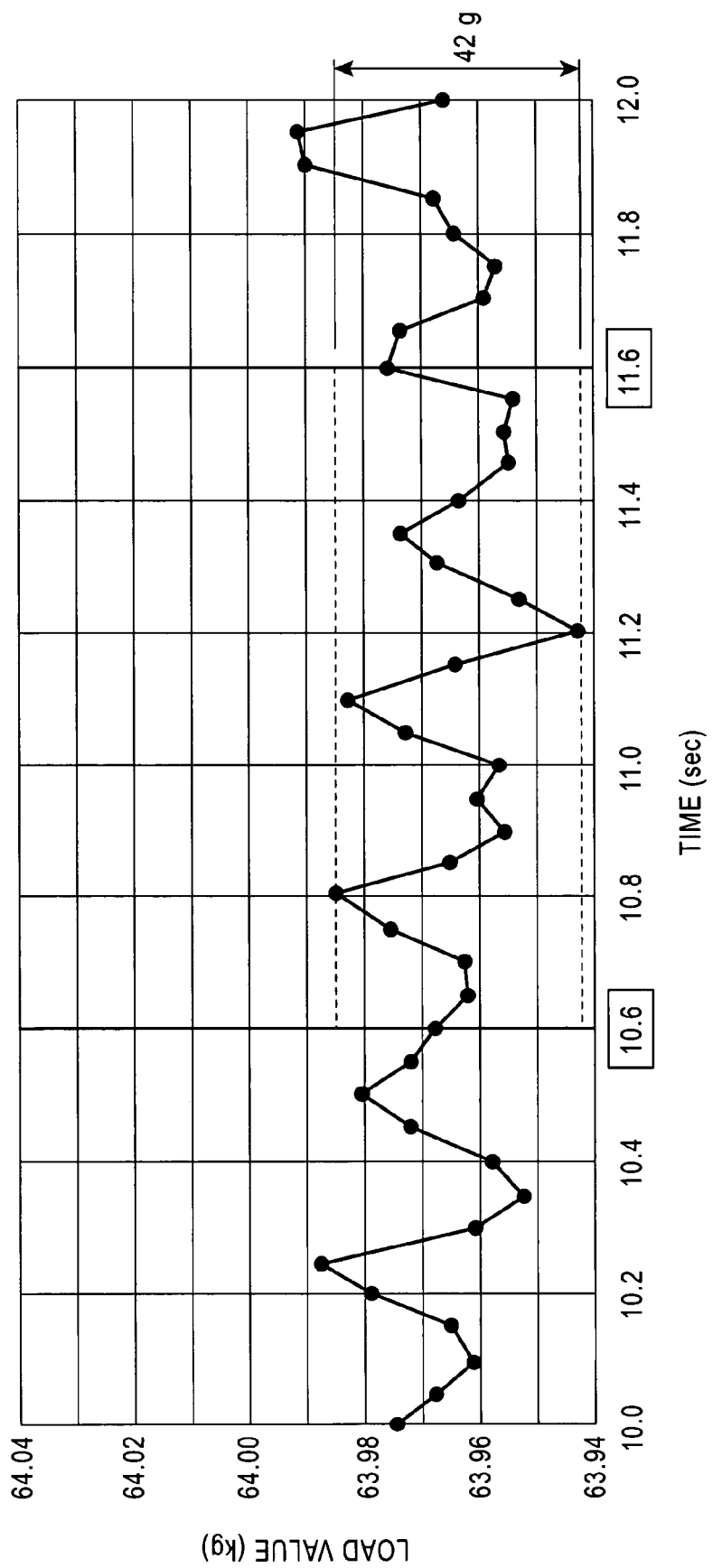

Hereinafter, Example 1 will be described with reference to the drawings. FIG. 1 is a block diagram illustrating an overview of the configuration of electrical circuit incorporated in a scale 1 which is an example of the present invention. FIG. 2 is a flowchart illustrating the operation of the scale 1. FIGS. 3(A) and 3(B) are graphs illustrating time-series fluctuation of body weight value when a subject stands on the scale 1. FIG. 3(A) is a graph illustrating the time-series fluctuation when the subject stands on the scale 1 in a normal state. FIG. 3(B) is a graph illustrating the time-series fluctuation when the subject stands on the scale 1 immediately after exercise.

As shown in FIG. 1, the scale 1 comprises a load sensor 2, an A/D converter 3, a control section 4, a computing section 5, a judgment section 6, a scale interval switching section 7, a storage section 8, a display section 9 and a power supply 10. The load sensor 2 is connected to the control section via the A/D converter 3 and constitutes data acquiring means for acquiring data about the body weight of a subject who stands on the scale 1. The computing section 5 computes a data fluctuation range based on a variation of the above acquired data, a body weight value according to a scale interval, and the like. The judgment section 6 determines which of allowable ranges of the data fluctuation range that have been set for multiple levels of scale intervals the data fluctuation range falls within by comparing the allowable ranges with the data fluctuation range and also makes a determination associated with display of the body weight value. The scale interval switching section 7 switches the scale interval according to the result of the determination. The storage section 8 stores the above data, computed data fluctuation range and body weight value, scale intervals set at multiple levels that are to be bases for the accuracy of the body weight value and allowable ranges of the data fluctuation range that correspond to the above scale intervals. The display section 9 displays at least the body weight value computed based on the above scale interval. The power supply 10 supplies electric power to the scale 1.

The scale 1 operates as follows. That is, as shown in FIG. 2, when the power of the scale 1 is turned on and a measurement is started, the scale 1 samples and acquires data about a body weight value imposed on the scale 1 by the data acquiring means and stores the data in the storage section 8 in STEP S1. In STEP S2, it is determined whether the above acquired data has reached a predetermined number of data. In this case, sampling time is 50 milliseconds, and the above predetermined number of data refers to the number of data acquired per second. In the above STEP S2, when the acquired data has not reached the predetermined number of data, the scale 1 proceeds to "NO" and returns to STEP S1 and repeats sampling, while when the acquired data has reached the predetermined number of data, the scale 1 proceeds to "YES" and computes a variation in data acquired for the predetermined number of data in the computing section 5 in STEP S3. In this case, a data fluctuation range A (g) is calculated from the difference between the maximum and minimum values of the data.

In each of subsequent STEPS S4 to S7, the degree of variation of the above data fluctuation range A is determined in the judgment section 6. More specifically, the judgment section 6 compares the data fluctuation range A with each of allowable ranges of the data fluctuation range which have been set for multiple levels of scale intervals, starting from the narrowest allowable range, and determines which of the allowable ranges the data fluctuation range A falls within. In the present example, the above scale interval is set at multiple levels of 10 g, 20 g, 50 g and 100 g and stored in the storage section 8 together with allowable ranges of the data fluctuation range for ensuring the reliability of a body weight value computed based on each scale interval. Further, the above allowable range of data fluctuation range which is stored for each scale interval is less than a half of each scale interval.

First, in STEP S4, it is determined whether the data fluctuation range A satisfies $0 \leq A < 5$. This allowable range ensures the reliability of a body weight value computed based on a scale interval of 10 g. When the data fluctuation range A is within this allowable range, the scale 1 proceeds to "YES" and the scale interval is switched to 10 g in the scale interval switching section 7 in STEP S8. Meanwhile, when the data fluctuation range A is equal to or larger than 5 g, the scale 1 proceeds to "NO", and the data fluctuation range A is compared with the next allowable range in STEP S5. In STEP S5, it is determined whether the data fluctuation range A satisfies $5 \leq A < 10$. This allowable range ensures the reliability of a body weight value computed based on a scale interval of 20 g. When the data fluctuation range A is within this allowable range, the scale 1 proceeds to "YES" and the scale interval is switched to 20 g in the scale interval switching section 7 in STEP S9. Meanwhile, when the data fluctuation range A is equal to or larger than 10 g, the scale 1 proceeds to "NO" and the data fluctuation range A is compared with the next allowable range in STEP S6. In STEP S6, it is determined whether the data fluctuation range A satisfies $10 \leq A < 25$. This allowable range ensures the reliability of a body weight value computed based on a scale interval of 50 g. When the data fluctuation range A is within this allowable range, the scale 1 proceeds to "YES" and the scale interval is switched to 50 g in the scale interval switching section 7 in STEP S10. Meanwhile, when the data fluctuation range A is equal to or larger than 25 g, the scale 1 proceeds to "NO" and the data fluctuation range A is compared with the next allowable range in STEP S7. In STEP S7, it is determined whether the data fluctuation range A satisfies $25 \leq A < 50$. This allowable range ensures the reliability of a body weight value computed based on a scale interval of 100 g. When the data fluctuation range A is within this allowable range, the scale 1 proceeds to "YES" and the scale interval is switched to 100 g in the scale interval switching section 7 in STEP S11.

Meanwhile, when the data fluctuation range A is equal to or larger than 50 g, the scale 1 proceeds to "NO" and returns to STEP S1 to carry out sampling of data again because a body weight value cannot be computed based on the above provided scale intervals due to an excessively large variation of the data. At that time, the oldest data out of the data stored in the storage section 8 is deleted, and newly acquired data is stored.

Next, an example of the relationship between the magnitude of the data fluctuation range A and the scale interval will be specifically described by use of experimentally acquired data illustrated in FIGS. 3(A) and 3(B). According to a graph in FIG. 3(A) illustrating time-series fluctuation of body weight value measured when a subject is in a normal state, because the fluctuation range A of data sampled in 1 second between 10.6 seconds and 11.6 seconds (sampling time: 50 ms) is 3(g) and is within a range of $0 \leq A < 5$, the scale interval can be switched to 10(g). Further, according to a graph in FIG. 3(B) illustrating time-series fluctuation of body weight value measured immediately after the subject has finished exercising, because the fluctuation range A of data sampled in 1 second between 10.6 seconds and 11.6 seconds (sampling time: 50 ms) is 42(g) and is within a range of $25 \leq A < 50$, the scale interval is switched to 100(g).

When the scale interval is switched in the scale interval switching section 7 in each of the above STEPS S8 to S11, a body weight value is computed based on the above scale interval in the computing section 5. In this case, the average of the predetermined number of data stored in the storage section 8 is computed as the body weight value, and the body weight value and the scale interval are stored in the storage section 8. In subsequent STEP S13, it is determined in the judgment section 6 whether the scale interval that has been used as a basis for the computation to obtain the above stored body weight value is the smallest scale interval (in this case, 10 g) out of the scale intervals which have been set at multiple levels and stored in advance. When it is the smallest scale interval, the scale 1 proceeds to "YES" and displays the above body weight value and scale interval in the display section 9 in STEP S16 and ends the measurement regardless of predetermined measurement time to be described later. Meanwhile, when it is not the smallest scale interval, the scale 1 proceeds to "NO" and it is determined in the judgment section 6 whether the predetermined measurement time required until the body weight value is displayed has been reached in STEP S14. When the predetermined time has not been reached, the scale 1 proceeds to "NO" and returns to STEP S1 to carry out sampling of data again. In this case as well, the oldest data out of the data stored in the storage section 8 is deleted, and newly acquired data is stored, as described above. Meanwhile, when the predetermined measurement time has been reached, the scale 1 proceeds to "YES", selects the smallest scale interval out of the scale intervals stored together with the body weight value in the above STEP S12 and reads out the body weight value from the storage section 8 in STEP S15, and displays the body weight value and scale interval in the display section 9 in STEP S16. However, when no body weight value is stored in the storage section 8, a measurement error is displayed in the display section 9 to explain that the body weight value cannot be computed and stored with the above provided scale intervals because the above fluctuation range A is too large.

EXAMPLE 2

The above Example 1 performs determination and switching of scale interval and computation of body weight value based on the scale interval for each sampling. Meanwhile, Example 2 of the present invention switches a scale interval based on a predetermined number of data acquired after passage of predetermined time in which a body weight is expected to become stable after a subject stands on a scale.

The constitution of the present Example 2 is the same as that of the scale 1 described by use of FIG. 1 in Example 1 and is therefore not illustrated. However, since some of the processes in the sections are different, the scale in the present Example 2 will be referred to as a body scale 101.

Figure 4:
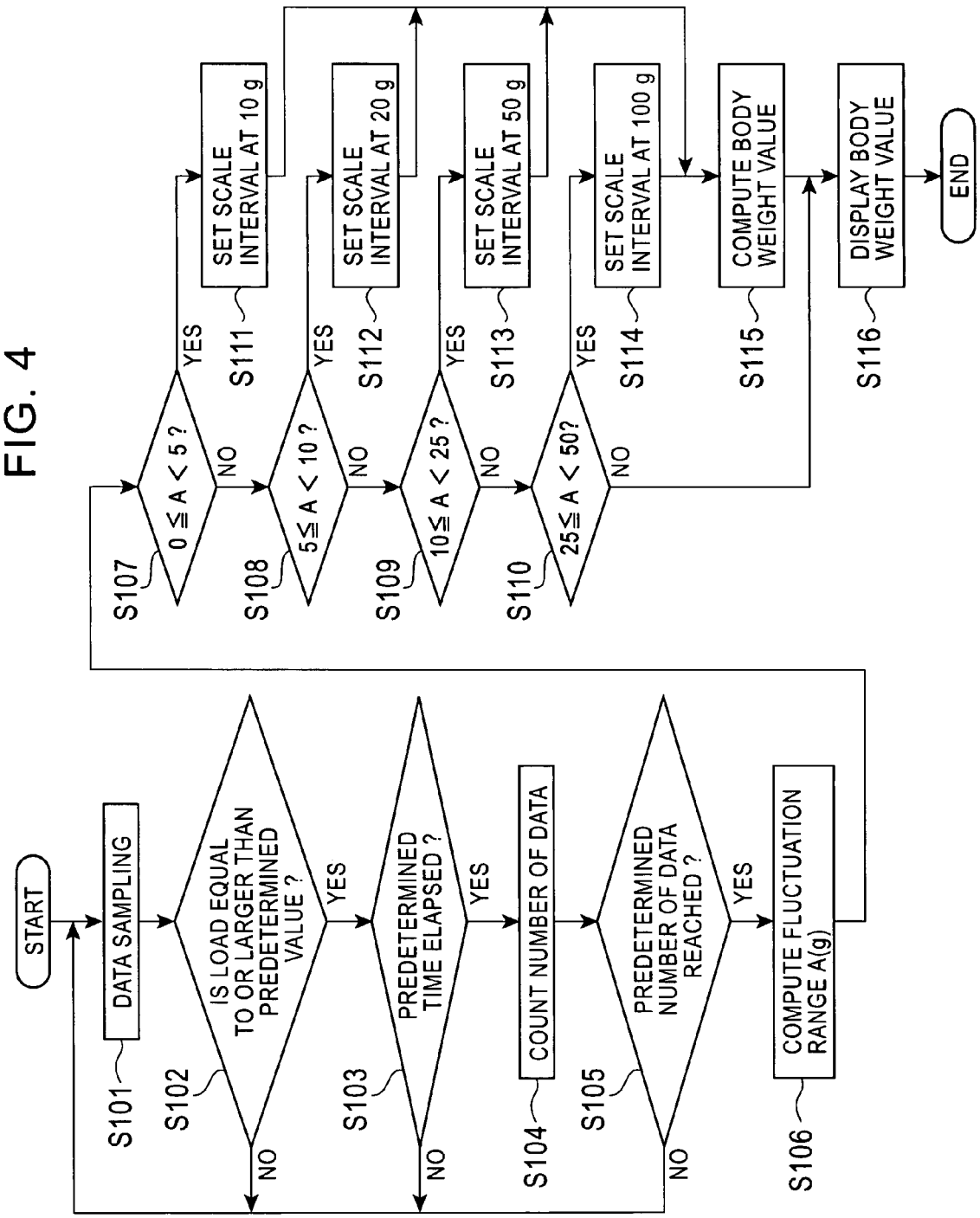
FIG. 4 is a flowchart illustrating the operation of a scale 101.

Hereinafter, the operation of the scale 101 will be described by use of a flowchart in FIG. 4 illustrating the operation of Example 2. When the power of the scale 101 is turned on and a measurement is started, the scale 101 samples and acquires data about a body weight value imposed on the scale 101 by the data acquiring means and stores the data in the storage section 8 in STEP S101. In STEP S102, it is determined in the judgment section 6 based on the acquired data whether the load is equal to or larger than a predetermined value. In this case, it is determined whether a subject has stood on the scale 101. When the load is smaller than the predetermined value, the scale 101 proceeds to "NO" and returns to STEP S101 and continues sampling, while when the load is equal to or larger than the predetermined value, the scale 101 proceeds to "YES", and it is determined in STEP S103 whether a predetermined time has elapsed since it was detected that the load was equal to or larger than the predetermined value, i.e. that the subject stood on the scale 101. In this case, the above predetermined time is time in which the body weight is expected to become stable after the subject stands on the scale 101 and is set in advance. When the predetermined time has not elapsed, the scale 101 proceeds to "NO" and returns to STEP S101 and stands by while repeating sampling, while when the predetermined time has elapsed, the scale 101 proceeds to "YES" and counts the above data in STEP S104.

Descriptions of the operations in STEPS S105 to S115 are omitted because they are the same as those in STEPS S2 to S12 illustrated in the flowchart of FIG. 2 in Example 1. However, in STEP S110 of FIG. 4, the scale 101 displays a measurement error in the display section 9 for the reason that the above fluctuation range A is too large when the result of determining whether $25 \leq A < 50$ holds is "NO", while in the corresponding STEP S7 of FIG. 2, the scale 1 returns to STEP S1 and carries out sampling again. In subsequent STEP S116, the body weight value computed based on the switched provided scale interval in the above STEP S115 is displayed in the display section 9.

Further, it is also possible that in STEP S1 of Example 1 and STEP S101 of Example 2, sampled data is subjected to a moving average procedure and the fluctuation range A is determined based on each value subjected to the moving average procedure.

Further, although a computed or stored body weight value and a scale interval which is a basis for computation of the body weight value out of preset scale intervals are displayed in the display section 9 in Examples 1 and 2, the data fluctuation range A may also be displayed in the display section 9 as the magnitude of body motion (e.g. "body sway A (g)").

What is claimed is:

1. A digital scale which computes a weight value based on a predetermined scale interval, the scale comprising:
    data acquiring means,
    computation means,
    storage means,
    judging means,
    scale interval switching means, and
    display means;
wherein
    the data acquiring means acquires digital data of a load continuously,
    the computation means computes a predetermined number or a fluctuation range in a predetermined time of the acquired digital data,
    the storage means stores a plurality of scale intervals set at multiple levels and allowable ranges of the fluctuation range that correspond to the scale intervals,
    the judging means determines the degree of variation of the digital data by comparing the computed fluctuation range with the allowable range of the fluctuation range which is stored for each scale interval,
    the scale interval switching means switches the scale interval to one scale interval selected from the plurality of scale intervals based on the determined degree of variation,
    the computation means computes a body weight value from the acquired digital data based on the selected scale interval switched by the scale interval switching means, and
    the display means displays the body weight value and the scale interval.

2. The digital scale of claim 1, wherein the judging means compares the computed fluctuation range with the allowable range of the fluctuation range which is stored for each scale interval, starting from the allowable range of the fluctuation range corresponding to the smallest scale interval to the allowable range of the fluctuation range corresponding to a larger scale interval in turn.

3. The digital scale of claim 1, wherein the display means displays a weight value computed based on the smallest scale interval out of switched scale intervals.

4. The digital scale of claim 2, wherein the display means displays a weight value computed based on the smallest scale interval out of switched scale intervals.

* * * * *